US011037096B2

(12) United States Patent
O'Hara et al.

(10) Patent No.: US 11,037,096 B2
(45) Date of Patent: Jun. 15, 2021

(54) DELIVERY PREDICTION WITH DEGREE OF DELIVERY RELIABILITY

(71) Applicant: Business Objects Software Limited, Dublin (IE)

(72) Inventors: Paul O'Hara, Dublin (IE); Ying Wu, Maynooth (IE); Paul Pallath, Mumbai (IN); Malte Christian Kaufmann, Dublin (IE); Orla Cullen, Dublin (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 293 days.

(21) Appl. No.: 15/856,814

(22) Filed: Dec. 28, 2017

(65) Prior Publication Data

US 2019/0205828 A1  Jul. 4, 2019

(51) Int. Cl.
*G06Q 10/08*  (2012.01)
*G06N 7/00*  (2006.01)

(52) U.S. Cl.
CPC ......... *G06Q 10/0833* (2013.01); *G06N 7/005* (2013.01)

(58) Field of Classification Search
CPC ............. G06Q 10/083; G06Q 10/0833; G06Q 10/0835; G06Q 10/0836; G06Q 10/0837
USPC ........................................................ 705/330
See application file for complete search history.

(56) References Cited

U.S. PATENT DOCUMENTS

| | | | |
|---|---|---|---|
| 10,467,322 B1* | 11/2019 | Cao .................. | G06F 17/00 |
| 2014/0330741 A1* | 11/2014 | Bialynicka-Birula ..................... G06Q 10/0838 705/341 |
| 2017/0017922 A1* | 1/2017 | Wicks ................ | G06Q 10/0838 |
| 2017/0154347 A1* | 6/2017 | Bateman ........... | G06Q 30/0202 |
| 2018/0096295 A1* | 4/2018 | Wang ................ | G06Q 10/0833 |
| 2018/0365634 A1* | 12/2018 | Clem ................. | G06N 3/084 |
| 2019/0156283 A1* | 5/2019 | Abebe ............... | G06K 9/6282 |
| 2019/0205829 A1* | 7/2019 | Abebe ............... | G06K 9/6223 |

OTHER PUBLICATIONS

Raman, Venki and Reddy, Sunil, "Predicting Delivery Time of Components in a Supply Chain", Technical Disclosure Commons, (Dec. 7, 2017) (Year: 2017).*

* cited by examiner

*Primary Examiner* — Emmett K. Walsh
(74) *Attorney, Agent, or Firm* — Buckley, Maschoff & Talwalkar LLC

(57) ABSTRACT

A method includes receiving a plurality of items, grouping the plurality of items into a plurality of clusters, where each of the plurality of clusters comprises items having similar features to one another, applying a classification model to each cluster to predict whether each item of a cluster will be delivered on time or delivered late, applying a regression model that determines an expected measure of tardiness of each item predicted to be delivered late, and outputting a delivery date prediction for each item predicted to be delivered late based on the expected measure of tardiness of the item.

18 Claims, 12 Drawing Sheets

DELIVERY PREDICTION WITH DEGREE OF DELIVERY RELIABILITY

BACKGROUND

Reliable delivery is key component of the operations and services of many organizations. Where a delivery date is provided, reliability and accuracy are often key considerations. For example, precise and reliable delivery provided by online retailers builds customer loyalty and encourages repeat purchases, reliable expected arrival/trip times provided by intelligent transportation systems increase public transit usage by commuters, reliable scheduled delivery provided by supply chain management allows for cost savings, reliable estimated software feature completion dates provided in relation to software development projects increase the confidence of stakeholders to commit resources to the correct features for a software release, and precise or exact delivery required by just-in-time scheduling maintains low inventory levels and reduces waste. Thus, some of the benefits of reliable delivery include increased reputation, broadened relationships, inspiring consumer confidence, increased profits, and improved efficiency.

Existing delivery date scheduling systems rely on user experience, communication, and product knowledge. For example, when a purchase order is created, users apply personal experience, communication with distribution channels/manufactures, product knowledge, and provide a scheduled delivery date with buffer window (e.g., interval of time) for early or tardy delivery. This is a labor-intensive and costly process prone to inaccuracy and inefficiency.

Given the importance of an accurate delivery date for enterprises in modern delivery related services and increased complexity of the operations and services of modern enterprises, it is desired to have the capability to assess the reliability of a provided delivery date.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
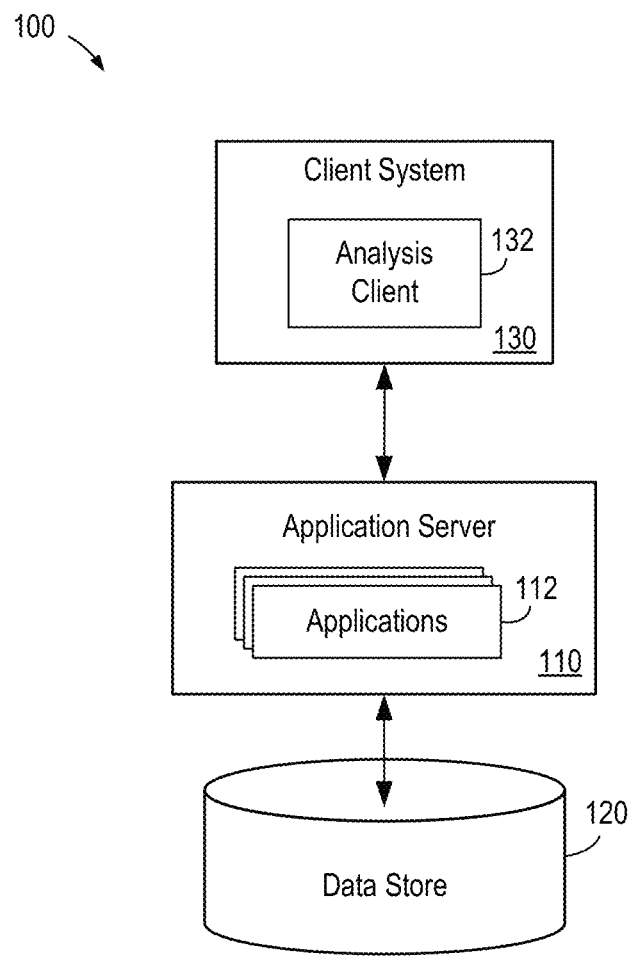
FIG. 1 is a block diagram of a system according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to predictive analytics, and more specifically, to delivery date prediction with a degree of delivery reliability (e.g., degree of on-time delivery). A multi-step reliable delivery date predictive solution is provided that can reliably determine the accuracy of scheduled delivery dates. The solution can be applied to any datum where a scheduled delivery date is produced. Generally, the accuracy of provided delivery dates is predicted, and when inaccuracy is predicted, an estimated window for delivery is provided.

FIG. 1 is a block diagram of a system 100 according to some embodiments. FIG. 1 represents a logical architecture for describing processes according to some embodiments, and actual implementations may include more or different components arranged in other manners.

System 100 includes application server 110 to provide data of data store 120 to client system 130. For example, application server 110 may execute one of applications 112 to receive a request for analysis from analysis client 132 executed by client system 130, to query data store 120 for data required by the analysis, receive the data from data store 120, perform the analysis on the data, and return results of the analysis to client system 130.

Data store 120 may comprise any one or more systems to store delivery item data. The data stored in data store 120 may be received from disparate hardware and software systems, some of which are not interoperational with one another. The systems may comprise a back-end data environment employed in a business or industrial context. The data may be pushed to data store 120 and/or provided in response to queries received therefrom.

Data store 120 may comprise a relational database, a multi-dimensional database, an eXtensible Markup Language (XML) document, and/or any other data storage system storing structured and/or unstructured data. The data of data store 120 may be distributed among several relational databases, dimensional databases, and/or other data sources. Embodiments are not limited to any number or types of data sources.

Data store 120 may implement an "in-memory" database, in which volatile (e.g., non-disk-based) storage (e.g., Random Access Memory) is used both for cache memory and for storing data during operation, and persistent storage (e.g., one or more fixed disks) is used for offline persistency of data and for maintenance of database snapshots. Alternatively, volatile storage may be used as cache memory for storing recently-used database data, while persistent storage stores data. In some embodiments, the data comprises one or more of conventional tabular data, row-based data stored in row format, column-based data stored in columnar format, and object-based data.

Client system 130 may comprise one or more devices executing program code of a software application for presenting user interfaces to allow interaction with applications 112 of application server 110. Client system 130 may comprise a desktop computer, a laptop computer, a personal digital assistant, a tablet PC, and a smartphone, but is not limited thereto.

Analysis client 132 may comprise program code of a spreadsheet application, a spreadsheet application with a plug-in allowing communication (e.g., via Web Services) with application server 110, a rich client application (e.g., a Business Intelligence tool), an applet in a Web browser, or any other application to perform the processes attributed thereto herein.

Although system 100 has been described as a distributed system, system 100 may be implemented in some embodiments by a single computing device. For example, both client system 130 and application server 110 may be embodied by an application executed by a processor of a desktop computer, and data store 120 may be embodied by a fixed disk drive within the desktop computer.

Figure 2:
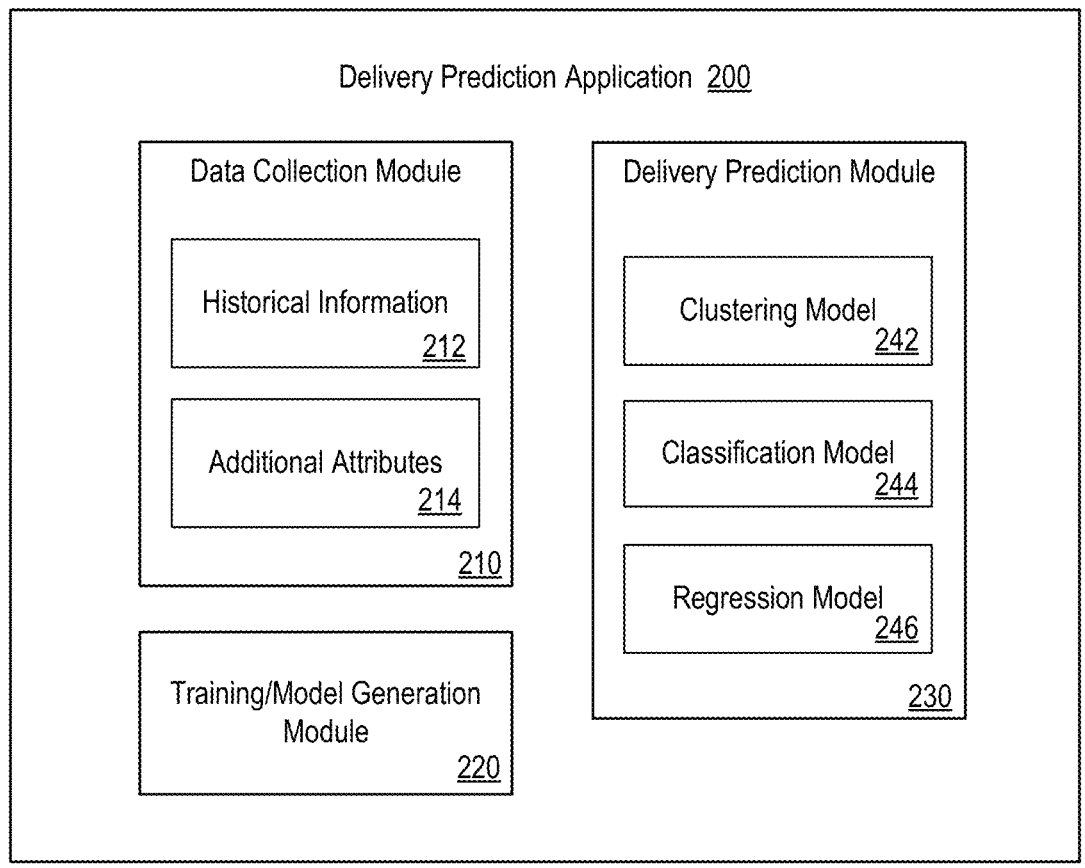
FIG. 2 is a block diagram in which an illustrative sub-component of the system of FIG. 1 is shown.

FIG. 2 is a block diagram illustrating an example embodiment of a delivery prediction application 200 provided as part of applications 112. The delivery prediction application 200 includes a data collection module 210, training/model generation module 220, and delivery prediction module 230. The training/model generation module 220 trains classification and regression models for delivery date prediction based on historical information 212 and, in some embodiments, additional attributes 214. In some embodiments, the training/model generation module 220 also trains a clustering model for grouping items into clusters. This clustering process may be performed in multiple ways. In one approach, clustering may be performed manually by a user, where the user selects segmentation points in the data on which to group together as a cluster and the number of clusters to produce. In another approach, clustering may be achieved through the application of a clustering algorithm.

In an example embodiment, the training/model generation module 220 generates one or more models including a clustering model 242, a classification model 244, and a regression model 246. The delivery prediction module 230 generates the delivery date prediction by applying delivery item data to the models generated by training/model generation module 220.

Figure 3:
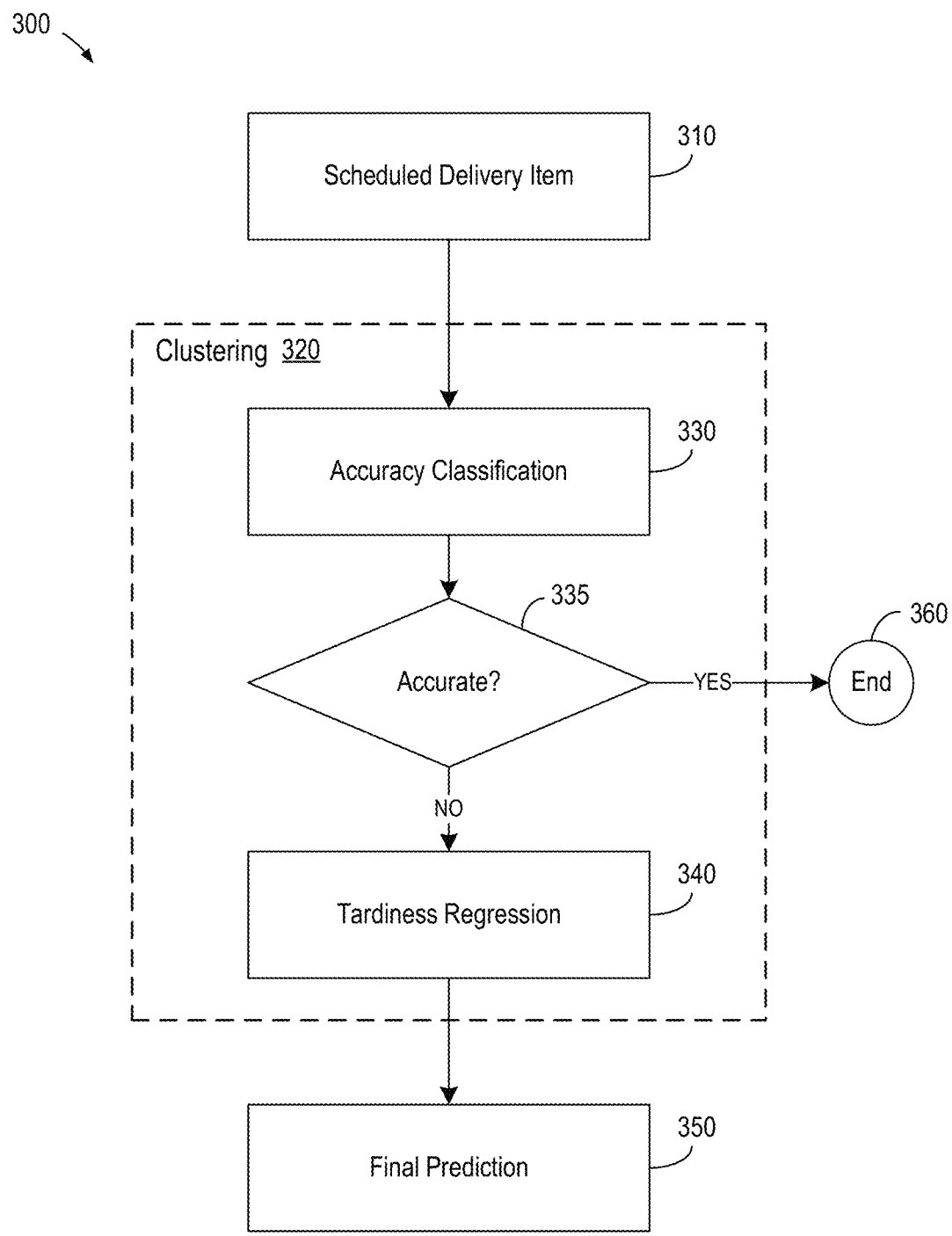
FIG. 3 is a flow diagram illustrating an exemplary delivery prediction process according to some embodiments.

FIG. 3 is a flow diagram illustrating an exemplary delivery prediction process 300 according to some embodiments.

Process 300 comprises three main parts: clustering 320, accuracy classification 330, and tardiness regression 340. A plurality of items (also referred to herein as "scheduled delivery item" or "delivery item") is received as input at 310. In some embodiments, delivery item data is taken from records in a database. For example, delivery item data may be read from multiple tables in a database and combined into a single table.

Clustering 320 is performed to group the plurality of items 310 into a plurality of clusters. Items 310 identified as having similar features are assigned to the same cluster. Thus, each item 310 is associated with a cluster candidate that is most similar to it.

A classification model 330 (e.g., accuracy classification) is applied to each cluster. In some embodiments, the output of the accuracy classification 330 is a binary value representing, for example, whether a scheduled delivery date for an item is accurate (e.g., on time or in-schedule) or inaccurate (e.g., late or not-in-schedule).

For items where the scheduled delivery date of the item is classified as accurate at 335, the process ends at 360.

For items where the scheduled delivery date of the item is classified as inaccurate at 335, a regression model 340 (e.g., tardiness regression) is applied to determine an expected measure of tardiness of the item. A delivery date prediction is output at 350 for each item predicted to be delivered late based on the expected measure of tardiness of the item.

Figure 4:
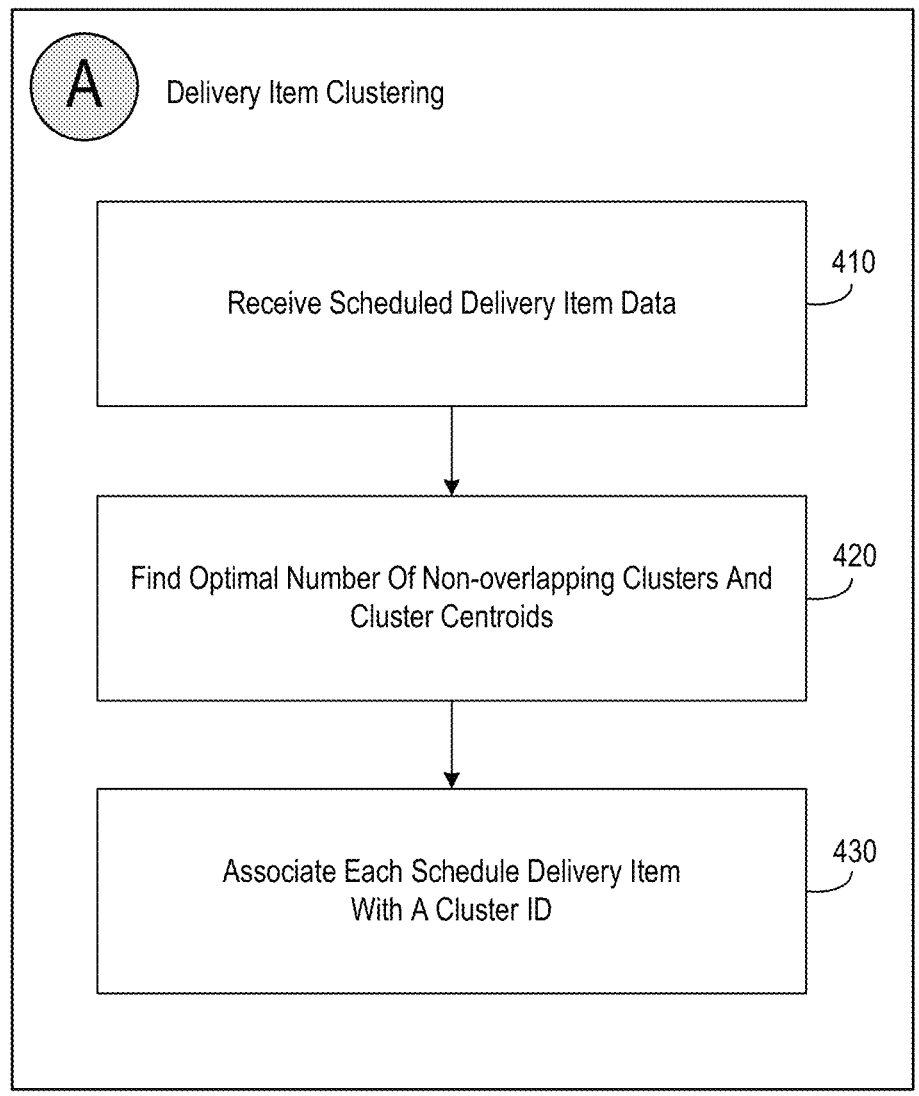
FIG. 4 is a flow diagram illustrating a clustering process according to some embodiments.

FIG. 4 illustrates the clustering process 320 of FIG. 3 in more detail. As shown in FIG. 4, delivery item data relating to scheduled delivery items is received as input at 410. Next, at 420, a clustering algorithm is performed to group the delivery items into a plurality of clusters where delivery items that share similar features are assigned to the same cluster. Non-overlapping clusters (e.g., including their cluster centroids) are identified as output. Each delivery item is associated with a particular cluster (e.g., identified by a cluster ID) at 430.

Figure 5:
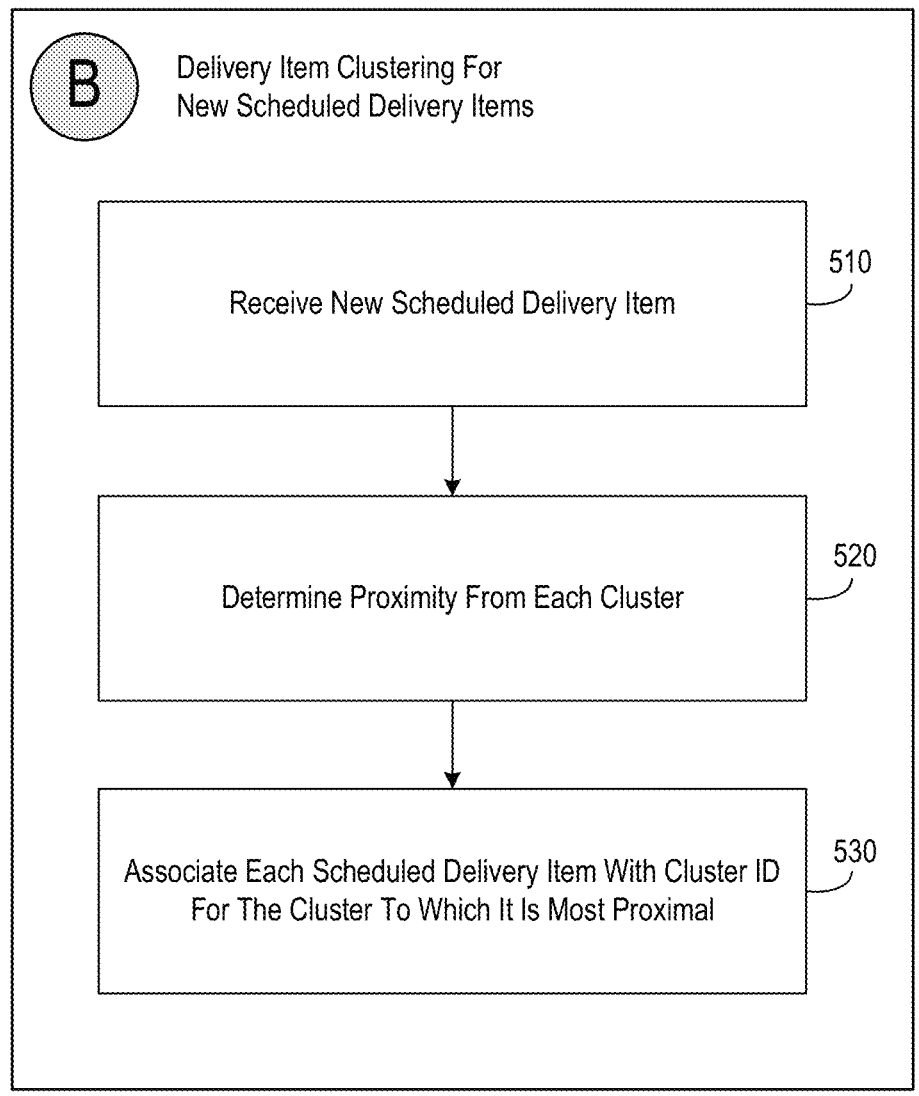
FIG. 5 is a flow diagram illustrating a clustering process according to some embodiments.

FIG. 5 illustrates how new delivery items are assigned to relevant clusters. Based on the trained clustering model in FIG. 4, for example, a new delivery item may be accepted as input for inclusion into an existing set of delivery items and assigned to the cluster with the most similar features (e.g., the optimal cluster).

As shown in FIG. 5, for each new delivery item received at 510, distances between the new delivery item and identified cluster centroids (e.g., a central point of a cluster) are computed at 520. The cluster with the smallest distance from the new delivery item is associated with that new delivery item at 530. In this way, the new delivery item is assigned to the optimal cluster amongst the identified clusters.

Figure 6:
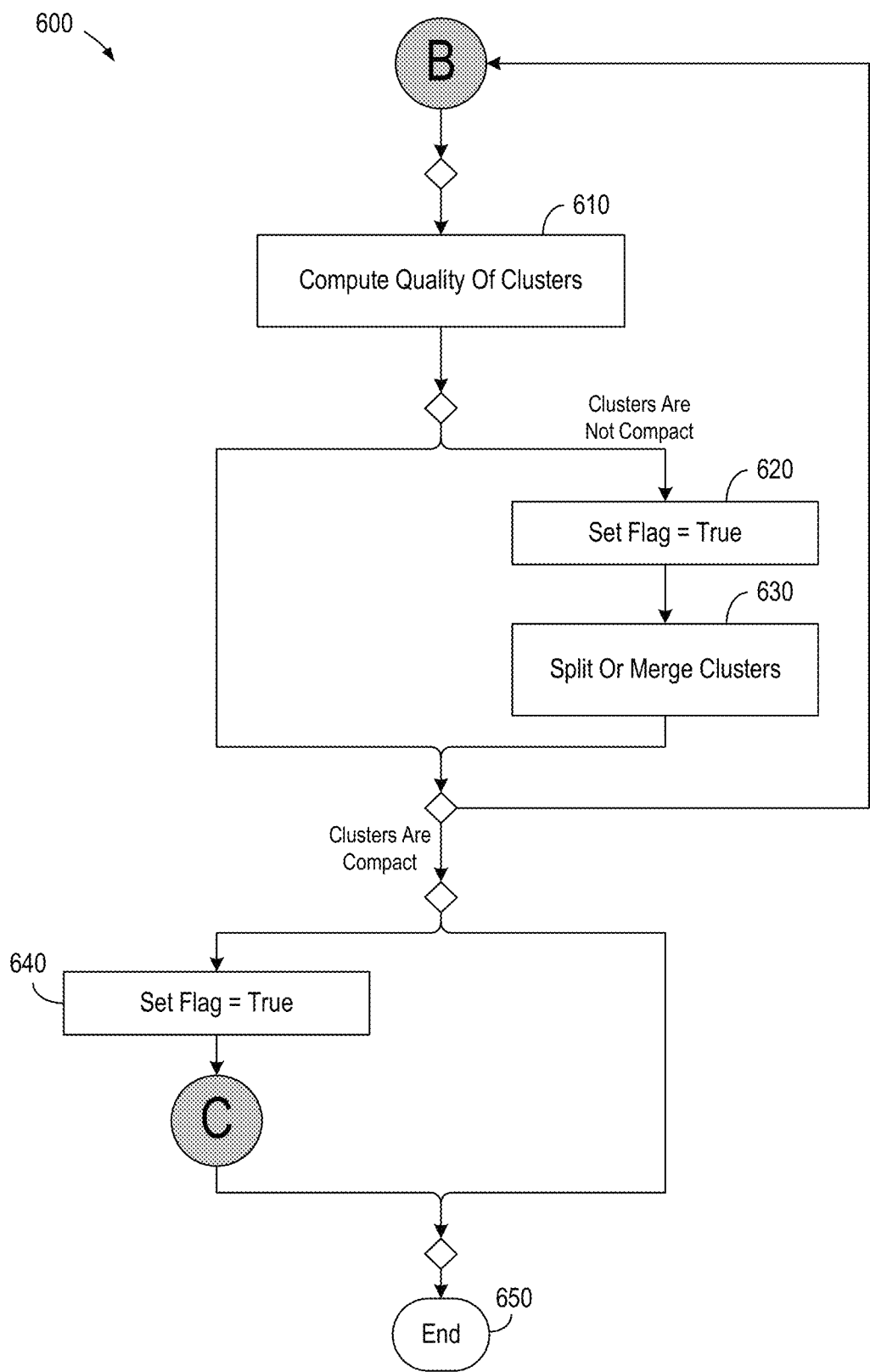
FIG. 6 is a flow diagram illustrating a clustering process according to some embodiments.

FIG. 6 illustrates a process 600 for re-calibrating clusters dynamically. The dynamics of the clusters may evolve and shift over time as available amount of data increases. For example, as new delivery items are assigned to existing clusters, two smaller clusters originally separated may gradually merge into a larger one, and a single larger cluster may gradually divide into smaller ones. In both of these cases, the clusters will be considered as no longer compact.

Traditional cluster splitting/merging algorithms may be applied in the re-calibrating process beginning at 610, where the quality of the clusters, such as that resulting from process detailed in FIG. 5 (labeled "B"), is computed. If it is determined that the quality of clustering can be improved by splitting or merging, a flag is set to true at 620 indicating that the clusters are not compact, and the change is accepted at 630 (e.g., to split or merge clusters). In one example, clusters that are not compact may split into two clusters. In another example, if the number of records in a cluster is less than a certain percentage ("x %") of the total number of scheduled delivery items, that cluster may be merged with the cluster nearest to it.

A validity index (e.g., a measure of the accuracy of the partitioning of data sets) may be calculated to evaluate changes to the existing clusters (e.g., the splitting or merging of clusters). If new clusters have been created, a flag is set to true at 640 to indicate that new clusters have been created and that underlying classification and regression models should be re-trained, at "C". The process ends at 650, with each scheduled delivery item being assigned to a corresponding cluster.

Figure 7:
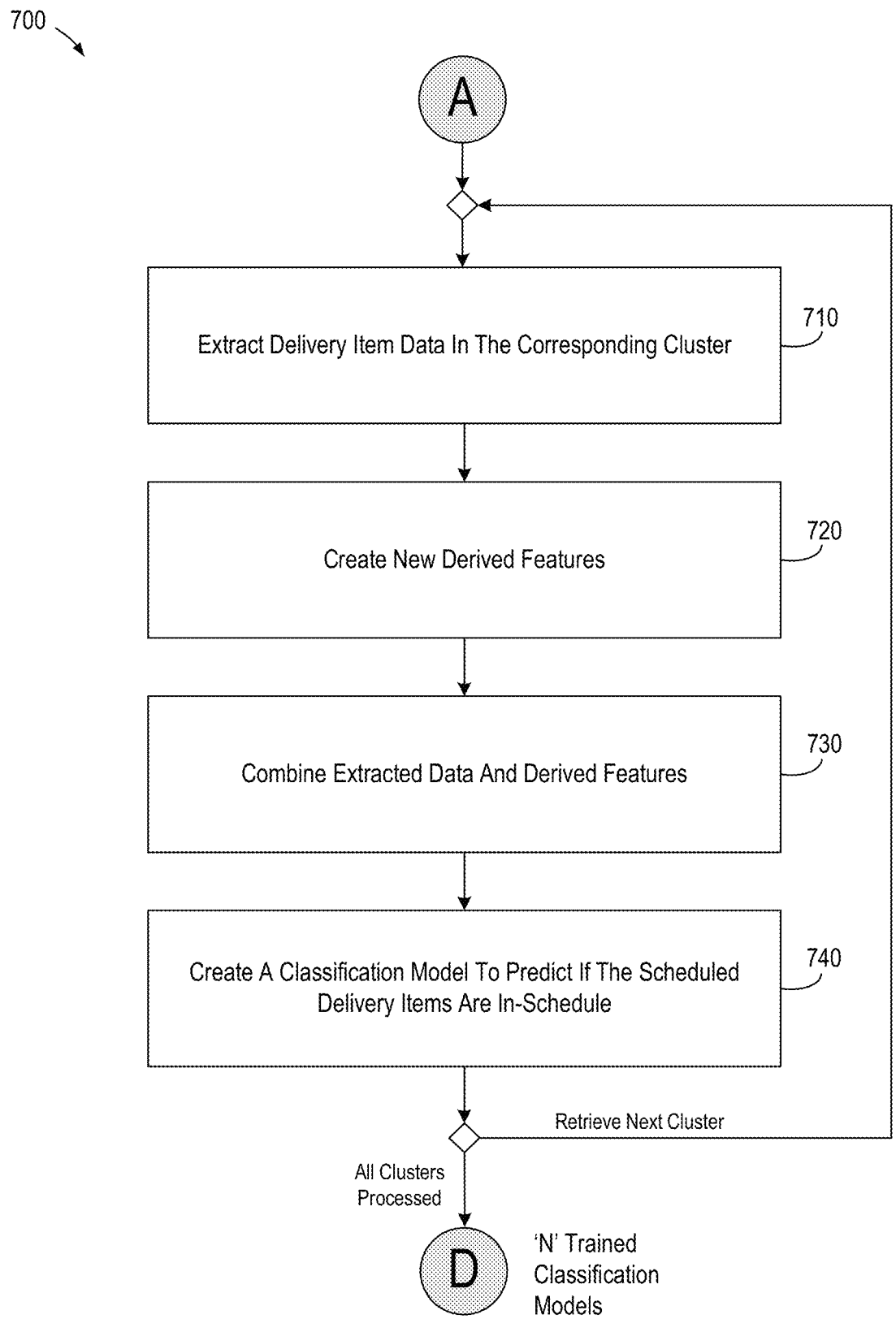
FIGS. 7 and 8 are flow diagrams illustrating a classification framework according to some embodiments.

FIG. 7 illustrates an in-schedule classification process. More specifically, FIG. 7 illustrates a process 700 for building a classification model for each delivery item cluster to predict in-schedule accuracy of scheduled delivery items.

For the purposes of this disclosure, "in-schedule" classification refers to determining whether a scheduled delivery date for a scheduled delivery item is accurate by analyzing historical information associated with the scheduled delivery items (also referred to herein as "historical scheduled delivery item records").

FIG. 7 contemplates that historical scheduled delivery items, each with different types of delivery items and/or different delivery behavior, could affect the accuracy of the classification when all the scheduled delivery items are handled using a single classification model. Therefore, in some embodiments, the following in-schedule classification model 700 is implemented to improve accuracy.

Initially, as shown in FIG. 7, historical scheduled delivery item records are used as the training dataset. In some embodiments, the output of the delivery item clustering, as detailed in FIG. 4 (labeled "A"), is taken as input. For each cluster of historical scheduled delivery items, an individual classification model is built to predict if the scheduled delivery date for the scheduled delivery item is accurate.

The classification model for each cluster is generated as follows. An iterative process begins at 710, by extracting delivery item data that is assigned to a corresponding cluster. In some embodiments, additional features relating to the delivery item data are derived at 720 to improve the accuracy of the classification model. The additional features may, for example, provide the classification model with more useful and/or more useable information to represent the underlying delivery behavior associated with the delivery items. Such additional features are in addition to the original delivery item data taken from records in a database. The extracted data and the derived features are combined at 730. A classification model is built/trained at 740 to predict if the delivery date for scheduled delivery items are accurate (e.g., in-schedule) or inaccurate (e.g., not-in-schedule). Steps 710-740 are repeated iteratively for each cluster until all clusters are processed. For example, if there are N clusters, N classification models are trained and output at "D". The trained classification models are used to predict, for each cluster, whether a delivery item delivery will be accurate (e.g., on time) or inaccurate (e.g., late). Application of the trained classification models (e.g., on a new dataset) is discussed next in FIG. 8.

Figure 8:
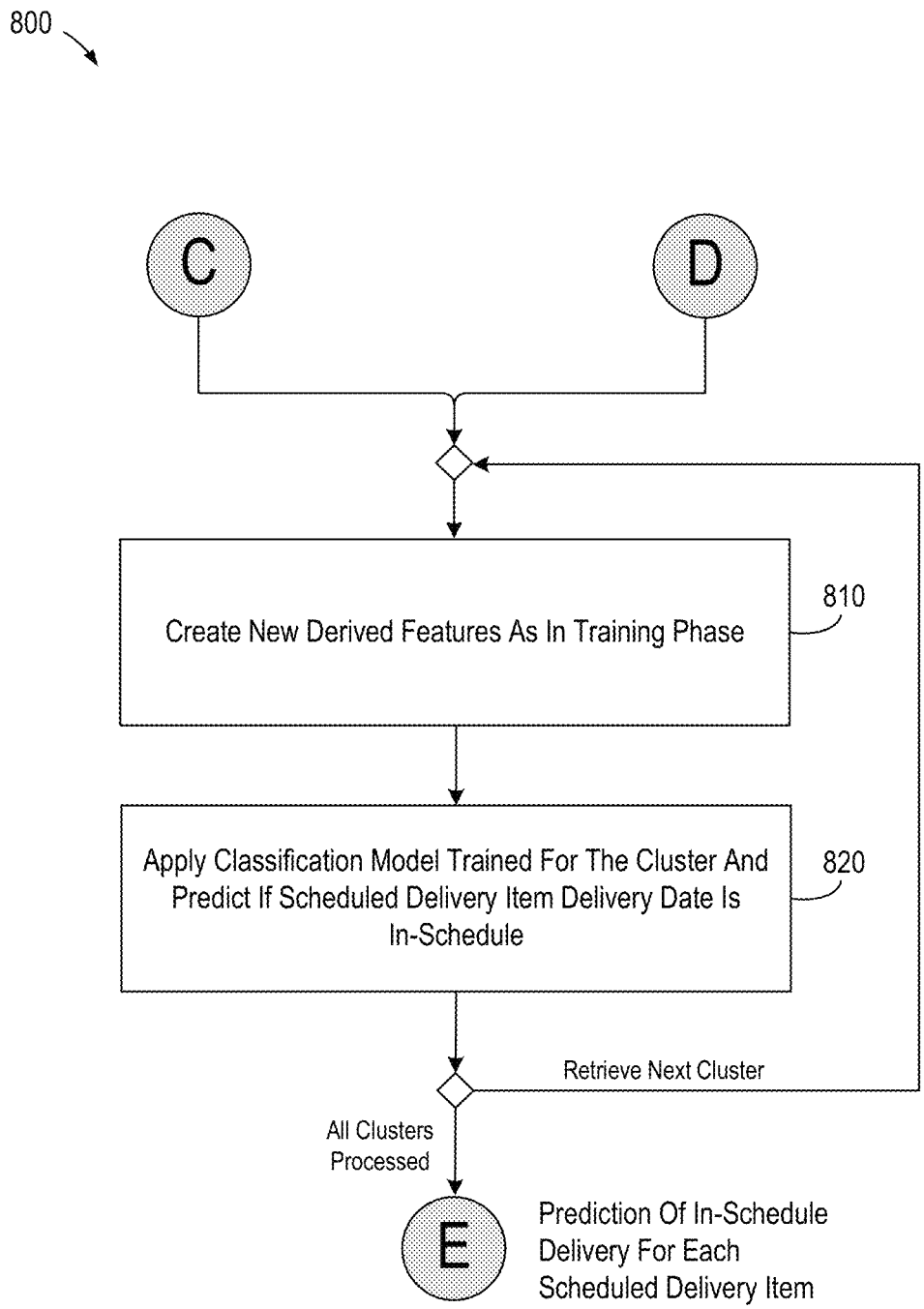

FIG. 8 illustrates a process 800 for applying the trained classification models for each cluster to predict whether the delivery date for a scheduled delivery item is in-schedule based on the delivery item clustering model (e.g., from FIG. 6) and the output of the in-schedule classification model (e.g., from FIG. 7), labeled "C" and "D", respectively.

As shown in FIG. 8, when a new scheduled delivery item is obtained, the same attributes used in the training stage at 720 are extracted and derived at 810. The new scheduled delivery item is assigned to a corresponding cluster. At 820, the classification model that is associated with the corresponding cluster is used to predict whether the delivery for the scheduled delivery item is in-schedule (e.g., on time). Steps 810-820 are repeated iteratively for each cluster until all clusters are processed. The output at "E" is a prediction of in-schedule delivery for each scheduled delivery item.

In some embodiments, a further determination is made as to how inaccurate (e.g., how tardy/late) a scheduled delivery item will be when the classification model predicts that the delivery date for the scheduled delivery item is inaccurate. This further determination is made using a further layer of machine learning (e.g., regression) discussed next in FIG. 9.

Figure 9:
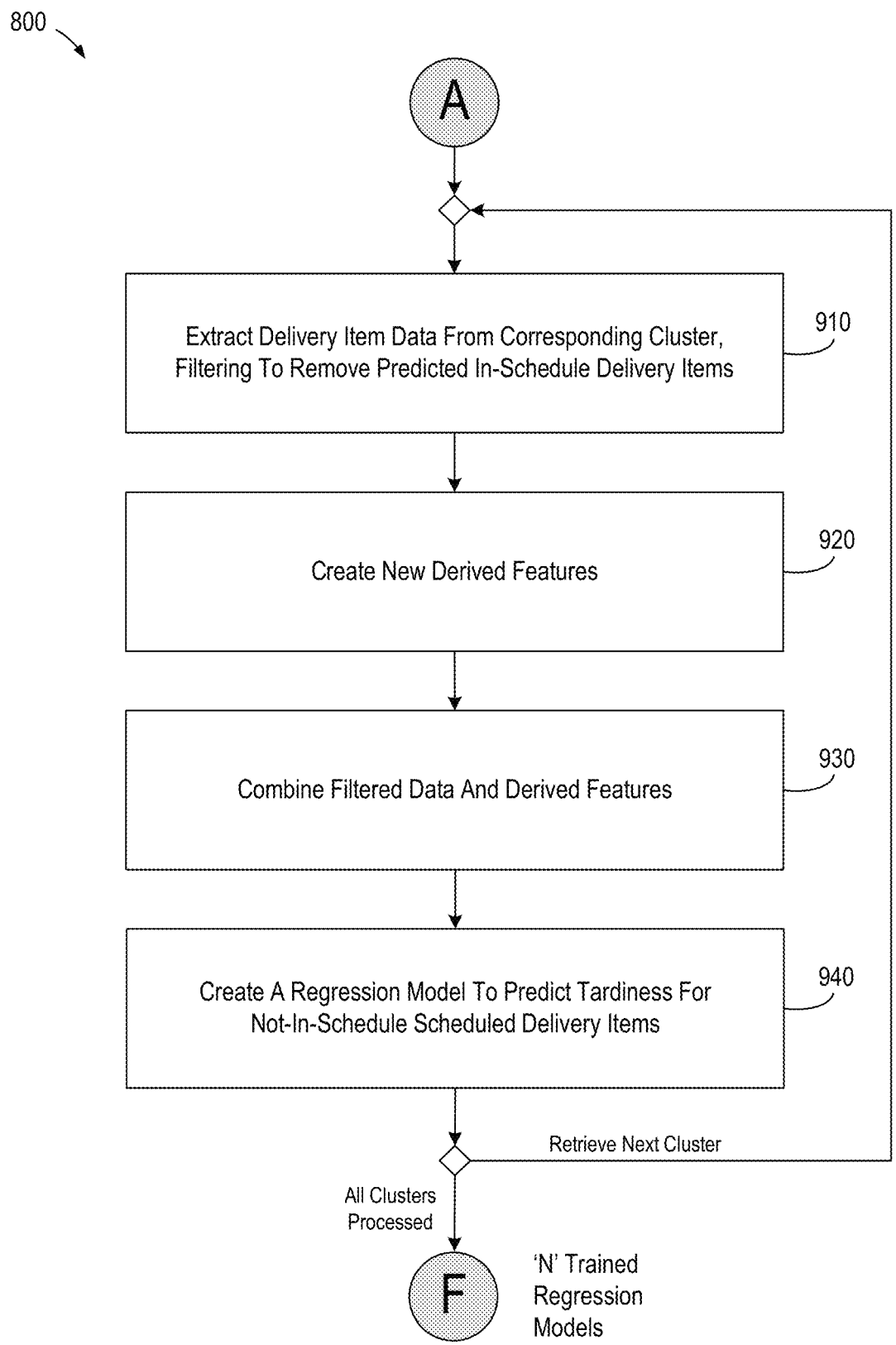
FIGS. 9 and 10 are flow diagrams illustrating a regression framework according to some embodiments.

FIG. 9 contemplates that historical scheduled delivery items, each with different types of delivery items and/or different delivery behavior, could affect the accuracy of the regression when all the scheduled delivery items are handled using a single regression model. Therefore, in some embodiments, the following regression model 900 is implemented to improve accuracy.

Initially, as shown in FIG. 9, historical scheduled delivery item records are used as the training dataset to build a regression model (e.g., tardiness regression model). In some embodiments, the output of the delivery item clustering, as detailed in FIG. 4 (labeled "A"), is taken as input. For each cluster of historical scheduled delivery items, an individual regression model is built to predict, when the scheduled delivery date for the scheduled delivery item is inaccurate, how inaccurate it is.

The regression model for each cluster is generated as follows. An iterative process begins at 910, by extracting historical scheduled delivery item records that are assigned to a corresponding cluster and filtering the records to include only records where the scheduled delivery dates for the scheduled delivery items were inaccurate (e.g., not-in-schedule). Accurate (e.g., in-schedule) delivery items are removed. In some embodiments, additional features relating to the delivery item data are derived at 920 to improve the accuracy of the regression model. The additional features may, for example, provide the regression model with more useful and/or more useable information to represent the underlying delivery behavior associated with the delivery items. The filtered data and the derived features are combined at 930. A regression model is built/trained at 940 to predict tardiness for inaccurate (e.g., not-in-schedule) scheduled delivery items.

In some embodiments, training of the classification models and the regression models are performed independently.

Steps 910-940 are repeated iteratively for each cluster until all clusters are processed. For example, if there are N clusters, N regression models are trained and output at "F". The trained regression models are used to predict, for each cluster, how tardy a not-in-schedule (e.g., late) delivery item delivery will be (e.g., a number of days, weeks, months, quarters, years, etc., that the delivery is expected to be late by). Application of the trained regression models (e.g., on a new dataset) is discussed next in FIG. 10.

Figure 10:
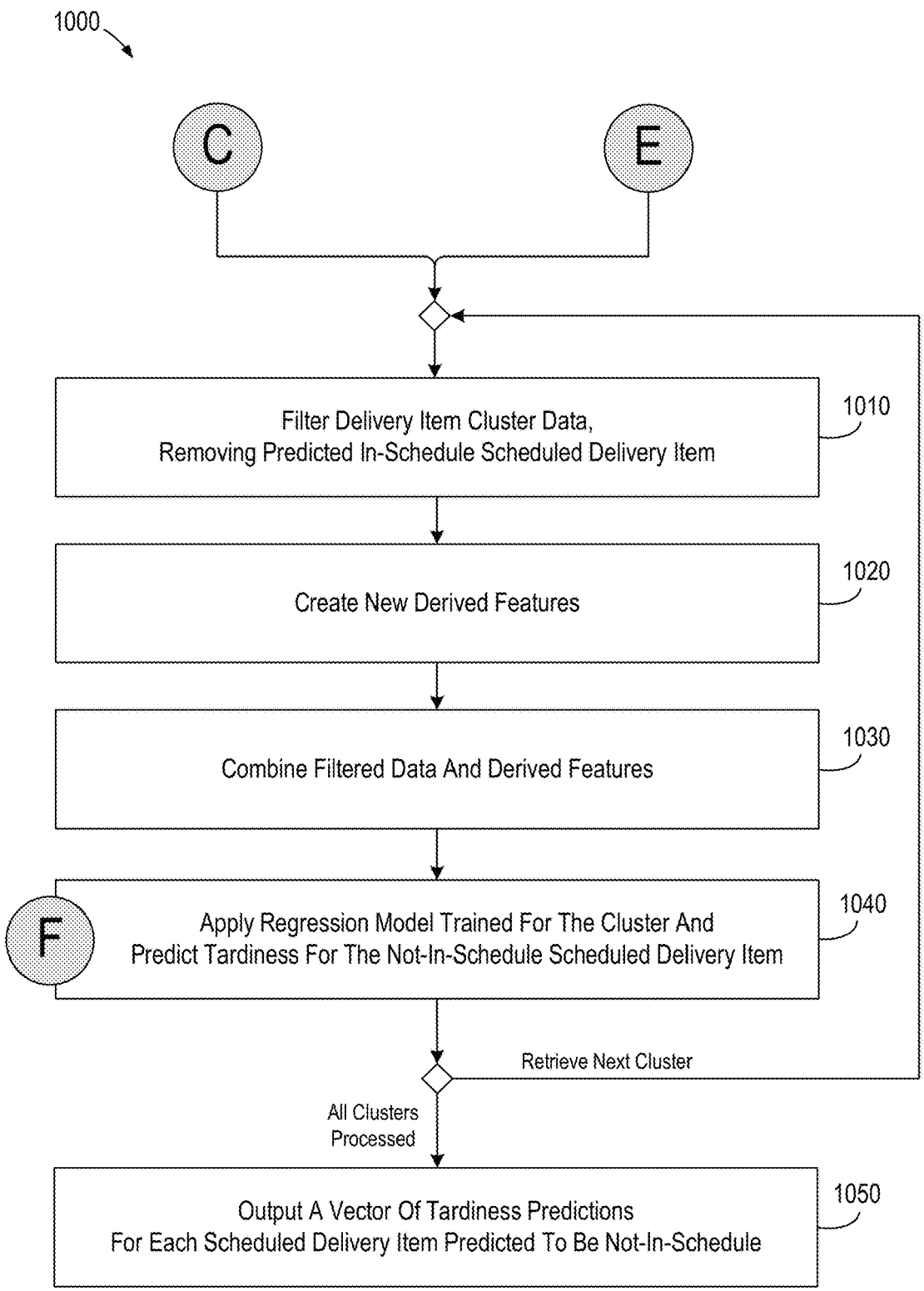

FIG. 10 illustrates a process 1000 for applying the trained regression models for each cluster to predict how tardy the delivery will be based on the delivery item clustering model (e.g., from FIG. 6) and the output of the in-schedule classification model where the scheduled delivery date is predicted to be not-in-schedule (e.g., from FIG. 8), labeled "C" and "E", respectively.

An iterative process begins at 1010 where, for each cluster, after the in-schedule classification model associated with the determined scheduled delivery item cluster is applied and predictions are obtained, the output is analyzed and scheduled delivery item(s) predicted to be in-schedule are filtered and removed. In some embodiments, additional features are derived at 1020 and combined with the filtered data at 1030.

The regression model (e.g., trained regression model from FIG. 9, labeled "F") associated with the scheduled delivery item cluster is applied at 1040. A vector or list of values is produced at 1050 as output, representing how tardy each delivery item will be for the remaining not-in-schedule delivery item(s).

By evaluating whether a scheduled delivery item will be in-schedule, and if not, how tardy, a reliable delivery date predictive solution may be achieved. Advantageously, enterprises may verify the accuracy of the derived scheduled delivery date, increasing confidence for in-scheduled delivery. Also advantageously, through earlier identification of scheduled delivery items where a not-in-schedule delivery item is likely, mitigating actions may be taken to ensure any impact from failing to meet a scheduled delivery date is minimized.

Figure 11:
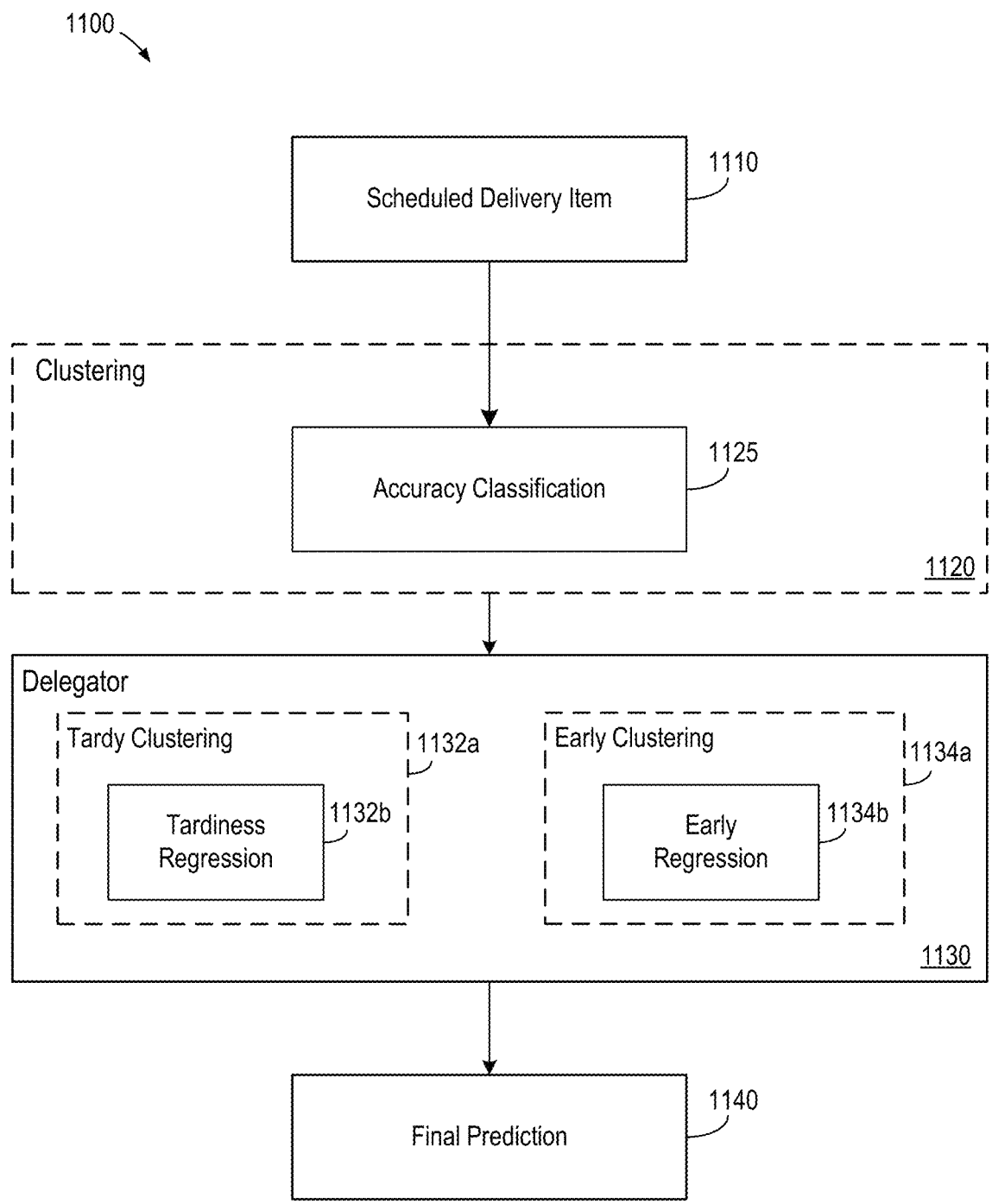
FIG. 11 is a flow diagram illustrating an exemplary delivery prediction process according to some embodiments.

FIG. 11 is a flow diagram illustrating an exemplary delivery prediction process 1100 according to some embodiments. More specifically, FIG. 11 illustrates an embodiment of the present disclosure similar to FIG. 3 with respect to scheduled delivery item 1110, clustering 1120, accuracy classification 1125, and final prediction 1140, except that the output of the initial accuracy classification at 1125 is now passed to a delegator portion 1130.

With the addition of the delegator portion 1130, alternative clustering, classification, or regression algorithms may follow the initial accuracy classification. The delegator portion 1130 applies one or more further clustering models 1132a, 1134a and classification/regression models 1132b, 1134b to the data based on desired requirements or situations and an accuracy heuristic. With just-in-time ("JIT") scheduling, for example, where the requirement is to ensure that a required delivery item is available exactly when it is needed, divergence from the scheduled delivery date through either an early or tardy delivery outside an agreed delivery window results in penalties applied.

Advantageously, with the addition of the delegator portion 1130, a wider range of scheduled delivery date scenarios may be predicted.

Figure 12:
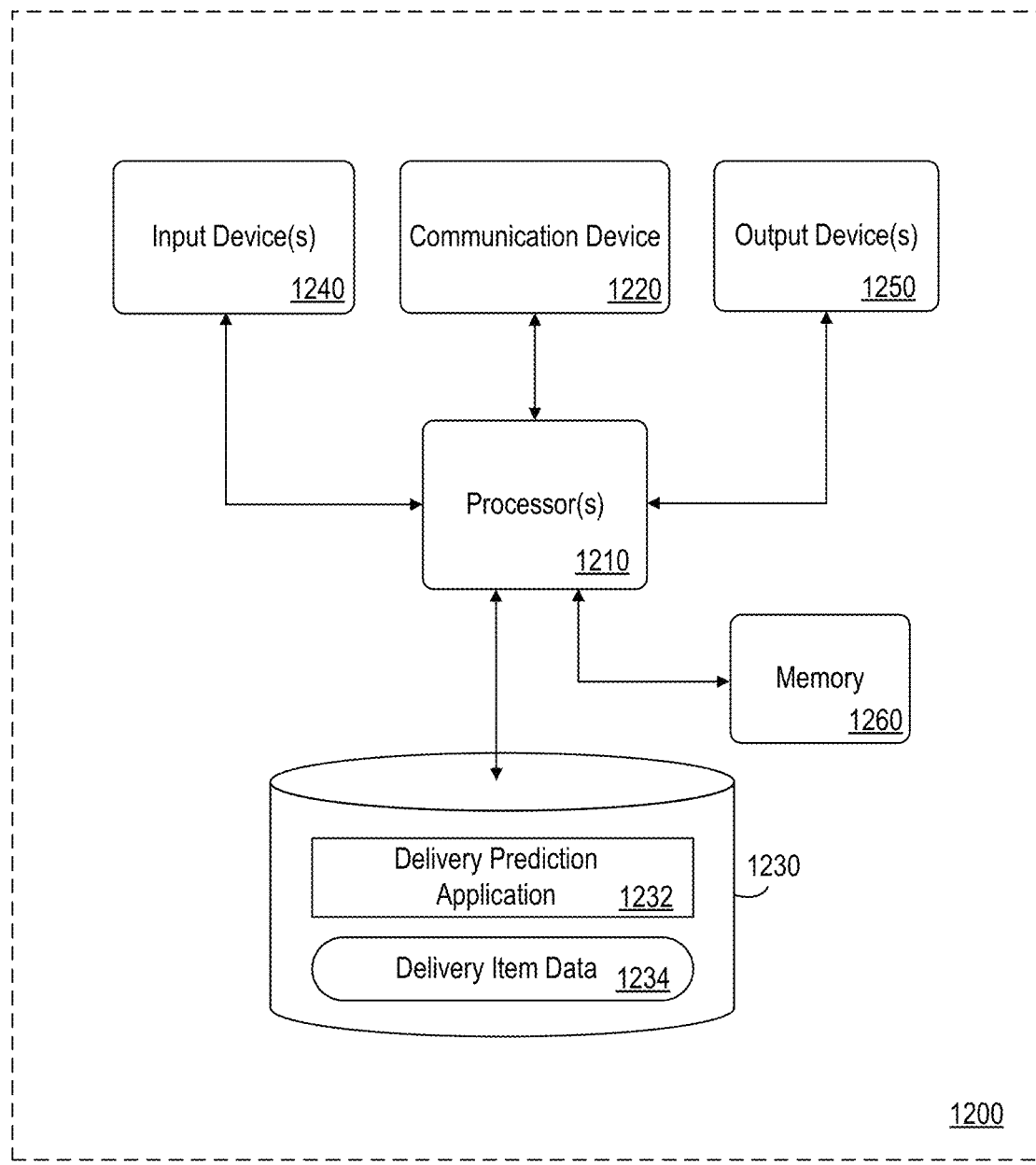
FIG. 12 is a block diagram of an apparatus according to some embodiments.

FIG. 12 is a block diagram of an apparatus 1200 according to some embodiments. Apparatus 1200 may comprise a general- or special-purpose computing apparatus and may execute program code to perform any of the functions described herein. Apparatus 1200 may comprise an implementation of one or more elements of system 100, such as application server 110. Apparatus 1200 may include other unshown elements according to some embodiments.

Apparatus 1200 includes processor 1210 operatively coupled to communication device 1220, data storage device 1230, one or more input devices 1240, one or more output devices 1250, and memory 1260. Communication device 1220 may facilitate communication with external devices, such as an application server 110. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to manipulate graphical user interfaces and to input information into apparatus 1200. Output device(s) 1250 may comprise, for example, a display (e.g., a display screen), a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

Delivery prediction application 1232 may comprise program code executed by processor 1210 to cause apparatus 1200 to perform any one or more of the processes described herein. Embodiments are not limited to execution of these processes by a single apparatus.

Delivery item data 1234 may store values associated with delivery items as described herein, in any format that is or becomes known. Delivery item data 1234 may also alternatively be stored in memory 1260. Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
  receiving a plurality of items from a plurality of records in a datastore, wherein the items have an assigned scheduled delivery date;
  grouping the plurality of items into a plurality of clusters, where each of the plurality of clusters comprises a plurality of items having similar features to one another;
  training a classification model via iterative machine learning with historical information and derived additional features for delivery date prediction, wherein the classification model learns the delivery behavior associated with historical data items;
  applying the classification model trained with historical information and derived additional features to each cluster to predict whether each item of a cluster will be delivered on time or delivered late, wherein an on-time delivery is a delivery by the assigned scheduled delivery date and a late delivery is a delivery after the assigned scheduled delivery date;
  for each cluster:
    building, using a computing device, a regression model based on items of the cluster, including:
      extracting delivery information for each item of the cluster;
      filtering the delivery information to remove items of the cluster predicted to be delivered on time;

deriving additional features related to each item of the cluster that remains after the filtering;

combining the filtered delivery information and the additional features; and building the regression model using the combined filtered delivery information and the additional features;

for each item predicted to be delivered late, applying the regression model that determines an expected measure of tardiness of the item; and outputting a delivery date prediction for each item predicted to be delivered late based on the expected measure of tardiness of the item.

2. The method of claim 1, further comprising, for each cluster:

building, using a computing device, the classification model based on items of the cluster, including:

extracting delivery information for each item of the cluster;

deriving additional features related to each item of the cluster;

combining the extracted delivery information and the additional features; and building the classification model using the combined extracted delivery information and the additional features.

3. The method of claim 1, wherein grouping the items into a plurality of clusters further comprises:

receiving a new item for inclusion in the plurality of items;

regrouping the plurality of items into a new plurality of clusters, where each of the plurality of new clusters comprises items having similar features to one another;

applying a new classification model to each new cluster to predict whether each item of a cluster will be delivered on time or delivered late;

for each item predicted to be delivered late, applying a new regression model that determines an expected measure of tardiness of the item; and outputting a new delivery date prediction for each item predicted to be delivered late based on the expected measure of tardiness of the item.

4. The method of claim 1, wherein the expected measure of tardiness of the item includes an interval of time during which the item will be delivered.

5. A computer-implemented method comprising:

receiving a plurality of items from a plurality of records in a datastore, wherein the items have an assigned scheduled delivery date;

grouping the plurality of items into a plurality of clusters, where each of the plurality of clusters comprises a plurality of items having similar features to one another;

training a classification model via iterative machine learning with historical information and derived additional features for delivery date prediction, wherein the classification model learns the delivery behavior associated with historical data items;

applying the classification model trained with historical information and derived additional features to each cluster to predict whether each item of a cluster will be delivered late or delivered early, wherein a late delivery is a delivery after the assigned scheduled delivery date and an early delivery is a delivery before the assigned scheduled delivery date;

for each cluster: building, using a computing device, a regression model based on items of the cluster including:

extracting delivery information for each item of the cluster;

filtering the delivery information to remove items of the cluster predicted to be delivered on time;

deriving additional features related to each item of the cluster that remains after the filtering;

combining the filtered delivery information and the additional features; and building the regression model using the combined filtered delivery information and the additional features; and outputting a delivery date prediction for each item.

6. The method of claim 5, further comprising, prior to outputting the delivery date prediction for each item, applying one or more clustering models and regression models to the items predicted to be delivered late; and applying one or more clustering models and regression models to the items predicted to be delivered early, wherein the delivery date prediction for each item includes an indication of a degree of lateness for the items predicted to be delivered late and a degree of earliness for the items predicted to be delivered early.

7. A computer-implemented method comprising:

receiving, from a plurality of records in a datastore, a plurality of delivery items with assigned scheduled delivery dates;

grouping the plurality of delivery items into a plurality of clusters of a plurality of delivery items having similar features;

training a classification model via iterative machine learning with historical information and derived additional features for delivery date prediction, wherein the classification model learns the delivery behavior associated with historical data items;

applying the classification model trained with historical information and derived additional features to each cluster;

classifying the delivery dates of each of the plurality of delivery items as a binary value representing whether the delivery date of a delivery item is accurate or inaccurate, wherein an accurate delivery date is a delivery by the assigned scheduled delivery date and an inaccurate delivery date is a delivery after the assigned scheduled delivery date;

for each cluster: building, using a computing device, a regression model based on items of the cluster, including:

extracting delivery information for each item of the cluster;

filtering the delivery information to remove items of the cluster predicted to be delivered on time;

deriving additional features related to each item of the cluster that remains after the filtering;

combining the filtered delivery information and the additional features; and building the regression model using the combined filtered delivery information and the additional features;

for each of the delivery dates of the delivery items classified as inaccurate, applying the regression model that predicts an expected degree of inaccuracy of the delivery date; and outputting a delivery date prediction for each delivery item classified as having an inaccurate delivery date based on the expected degree of inaccuracy of the delivery date.

8. The method of claim 7, wherein the expected degree of inaccuracy of the delivery date includes a window of time during which the delivery item will be delivered.

9. A system comprising:
a processor; and
a memory in communication with the processor, the memory storing program instructions, the processor operative with the program instructions to perform the operations of:
receiving a plurality of scheduled delivery items from a plurality of records in a datastore, wherein the items have an assigned scheduled delivery date;
grouping the plurality of scheduled delivery items into a plurality of clusters, where each of the plurality of clusters comprises a plurality of scheduled delivery items having similar features to one another;
training a classification model via iterative machine learning with historical information and derived additional features for delivery date prediction, wherein the classification model learns the delivery behavior associated with historical data items;
applying the classification model trained with historical information and derived additional features to each cluster to predict whether each scheduled delivery item of a cluster will be delivered on time or delivered late, wherein an on time delivery is a delivery by the assigned scheduled delivery date and a late delivery is a delivery after the assigned scheduled delivery date;
for each cluster:
building, using a computing device, a regression model based on scheduled delivery items of the cluster, including:
extracting delivery information for each scheduled delivery item of the cluster;
filtering the delivery information to remove delivery items of the cluster predicted to be delivered on time;
deriving additional features related to each scheduled delivery item of the cluster that remains after the filtering;
combining the filtered delivery information and the additional features; and
building the regression model using the combined filtered delivery information and the additional features;
for each scheduled delivery item predicted to be delivered late, applying the regression model that determines an expected measure of tardiness of the scheduled delivery item; and
outputting a delivery date prediction for each scheduled delivery item predicted to be delivered late based on the expected measure of tardiness of the scheduled delivery item.

10. The system of claim 9, further comprising, for each cluster:
building, using a computing device, the classification model based on scheduled delivery items of the cluster, including:
extracting delivery information for each scheduled delivery item of the cluster;
deriving additional features related to each scheduled delivery item of the cluster;
combining the extracted delivery information and the additional features; and
building the classification model using the combined extracted delivery information and the additional features.

11. The system of claim 9, wherein grouping the items into a plurality of clusters further comprises:
receiving a new delivery item for inclusion in the plurality of scheduled delivery items;
regrouping the plurality of scheduled delivery items into a new plurality of clusters, where each of the plurality of new clusters comprises delivery items having similar features to one another;
applying a new classification model to each new cluster to predict whether each item of a cluster will be delivered on time or delivered late;
for each delivery item predicted to be delivered late, applying a new regression model that determines an expected measure of tardiness of the delivery item; and
outputting a new delivery date prediction for each delivery item predicted to be delivered late based on the expected measure of tardiness of the delivery item.

12. The system of claim 9, wherein the expected measure of tardiness of the delivery item includes an interval of time during which the item will be delivered.

13. A system comprising:
a processor; and
a memory in communication with the processor, the memory storing program instructions, the processor operative with the program instructions to perform the operations of:
receiving a plurality of delivery items from a plurality of records in a datastore, wherein the items have an assigned scheduled delivery date;
grouping the plurality of delivery items into a plurality of clusters, where each of the plurality of clusters comprises a plurality of delivery items having similar features to one another;
training a classification model via iterative machine learning with historical information and derived additional features for delivery date prediction, wherein the classification model learns the delivery behavior associated with historical data items;
applying the classification model trained with historical information and derived additional features to each cluster to predict whether each delivery item of a cluster will be delivered late or delivered early, wherein a late delivery is a delivery after the assigned scheduled delivery date and an early delivery is a delivery before the assigned scheduled delivery date;
for each cluster: building a regression model based on items of the cluster including:
extracting the delivery information for each item of the cluster;
filtering the delivery information to remove items of the cluster predicted to be delivered on time;
deriving additional features related to each item of the cluster that remains after the filtering;
combining the filtered delivery information and the additional features; and
building the regression model using the combined filtered delivery information and the additional features;
applying one or more clustering models and regression models to the items predicted to be delivered late;

applying one or more clustering models and regression models to the items predicted to be delivered early; and outputting a delivery date prediction for each delivery item.

14. The system of claim 13, wherein the delivery date prediction for each delivery item identifies a time window specifying a period during which the delivery item will be delivered.

15. The system of claim 14, wherein the time window specifies a period of time spanning a number of: hours, days, weeks months, quarters, or years.

16. A system comprising:

a processor; and a memory in communication with the processor, the memory storing program instructions, the processor operative with the program instructions to perform the operations of:

receiving, from a plurality of records in a datastore, a plurality of delivery items with assigned scheduled delivery dates;

grouping the plurality of delivery items into a plurality of clusters of a plurality of delivery items having similar features;

training a classification model via iterative machine learning with historical information and derived additional features for delivery date prediction, wherein the classification model learns the delivery behavior associated with historical data items;

identifying with the classification model, based in part on historical information and derived additional features, each of the plurality of delivery items for which the assigned scheduled delivery dates are inaccurate, wherein an inaccurate assigned scheduled delivery date is a when a delivery occurs after the assigned scheduled delivery date;

for each cluster: building a regression model based on items of the cluster, including:

extracting delivery information for each item of the cluster;

filtering the delivery information to remove items of the cluster predicted to be delivered on time;

deriving additional features related to each item of the cluster that remains after the filtering;

combining the filtered delivery information and the additional features; and building the regression model using the combined filtered delivery information and the additional features;

for each of the assigned scheduled delivery dates of the delivery items identified as inaccurate, predicting, via the regression model, a time window specifying a period during which the delivery item will be delivered; and outputting a delivery date prediction for each delivery item identified as having an inaccurate assigned scheduled delivery date based on the time window.

17. A non-transitory computer readable medium having stored therein instructions that when executed cause a computer to perform a method comprising:

receiving a plurality of items from a plurality of records in a datastore, wherein the items have an assigned scheduled delivery date;

grouping the plurality of items into a plurality of clusters, where each of the plurality of clusters comprises a plurality of items having similar features to one another;

training a classification model via iterative machine learning with historical information and derived additional features for delivery date prediction, wherein the classification model learns the delivery behavior associated with historical data items;

applying the classification model trained with historical information and derived additional features to each cluster to predict whether each item of a cluster will be delivered on time or delivered late, wherein an on-time delivery is a delivery by the assigned scheduled delivery date and a late delivery is a delivery after the assigned scheduled delivery date;

for each cluster: building, using a computing device, a regression model based on items of the cluster, including:

extracting delivery information for each item of the cluster;

filtering the delivery information to remove items of the cluster predicted to be delivered on time;

deriving additional features related to each item of the cluster that remains after the filtering;

combining the filtered delivery information and the additional features; and building the regression model using the combined filtered delivery information and the additional features;

for each item predicted to be delivered late, applying the regression model that determines an expected interval of time during which the item will be delivered; and outputting a delivery date prediction for each item predicted to be delivered late based on the expected interval of time.

18. A non-transitory computer readable medium having stored therein instructions that when executed cause a computer to perform a method comprising:

receiving a plurality of items from a plurality of records in a datastore, wherein the items have an assigned scheduled delivery date;

grouping the plurality of items into a plurality of clusters, where each of the plurality of clusters comprises a plurality of items having similar features to one another;

training a classification model via iterative machine learning with historical information and derived additional features for delivery date prediction, wherein the classification model learns the delivery behavior associated with historical data items;

applying the classification model trained with historical data and derived additional features to each cluster to predict whether each item of a cluster will be delivered late or delivered early, a late delivery is a delivery after the assigned scheduled delivery date and an early delivery is a delivery before the assigned scheduled delivery date;

for each cluster, building via a computing device, a regression model based on items of the cluster, including:

extracting delivery information for each item of the cluster;

filtering the delivering information to remove items of the cluster predicted to be delivered on time;

deriving additional features related to each item of the cluster that remains after the filtering;

combining the filtered delivery information and the additional features; and building the regression model using the combined filtered delivery information and the additional features;
applying one or more clustering models and regression models to the items predicted to be delivered late;
applying one or more clustering models and regression models to the items predicted to be delivered early; and
outputting a delivery date prediction for each item.

\* \* \* \* \*